(12) United States Patent
Matsuura (10) Patent No.: US 8,400,938 B2
(45) Date of Patent: Mar. 19, 2013

(54) WIRELESS COMMUNICATION DEVICE, WIRELESS COMMUNICATION SYSTEM, AND WIRELESS COMMUNICATION METHOD

(75) Inventor: Nagahiro Matsuura, Nagoya (JP)

(73) Assignee: Buffalo Inc., Nagoya (JP)

( * ) Notice: Subject to any disclaimer, the term of this patent is extended or adjusted under 35 U.S.C. 154(b) by 313 days.

(21) Appl. No.: 12/788,221

(22) Filed: May 26, 2010

(65) Prior Publication Data

US 2010/0302966 A1  Dec. 2, 2010

(30) Foreign Application Priority Data

May 29, 2009  (JP) ................................. 2009-129933

(51) Int. Cl.
*G01R 31/08* (2006.01)
(52) U.S. Cl. ........................................ 370/252; 370/329
(58) Field of Classification Search .................. 370/352, 370/252, 329
See application file for complete search history.

(56) References Cited

U.S. PATENT DOCUMENTS

| 2009/0040971 A1 | 2/2009 | Alicot et al. | |
|---|---|---|---|
| 2009/0116400 A1* | 5/2009 | Sekiya et al. | 370/252 |

FOREIGN PATENT DOCUMENTS

| CN | 101189897 A | 5/2008 |
|---|---|---|
| JP | 2005-286765 | 10/2005 |
| JP | 2005-539431 | 12/2005 |
| JP | 2007-158485 | 6/2007 |
| JP | 2007-214713 | 8/2007 |
| JP | 2007-325041 | 12/2007 |
| JP | 2008-306409 | 12/2008 |
| JP | 2009-100210 | 5/2009 |

OTHER PUBLICATIONS

Notice of Reasons for Refusal dated Aug. 23, 2011, from Japanese Application No. 2009-129933.
Notice of Reasons for Refusal dated Jun. 7, 2011 from Japanese Application No. 2009-129933.
Notification of Reason for Rejection dated Mar. 29, 2011 from Japanese Application No. 2009-129933.
English Translation of a Chinese Office Action for Application No. 201010188713.7 dated Oct. 11, 2012.

* cited by examiner

*Primary Examiner* — Sai-Ming Chan
(74) *Attorney, Agent, or Firm* — Beyer Law Group LLP (57) ABSTRACT

An access point establishing a wireless LAN is constructed to have a monitor system 'b' for monitoring an available channel for communication, in addition to a communication system 'a'. In the event of detection of radar/radio signals, the access point changes a communication channel used for wireless communication from a current active channel to the monitored channel. Each terminal belonging to the wireless LAN recognizes and follows this channel change by detection of a beacon broadcasted by the access point. In the case of non-detection of radar/radio signals for one minute at the monitored channel, the wireless communication is reestablished immediately at the monitored channel recognized as a CAC (channel availability check)-finished channel. This series of processing is also applicable to inter-access point communication, for example, communication in a WDS (wireless distribution system) mode. This arrangement desirably prevents the potential interruption of wireless communication in a 5 GHz frequency band for a significant period, in the event of detection of radar/radio signals, for example, a weather radar.

8 Claims, 9 Drawing Sheets

WIRELESS COMMUNICATION DEVICE, WIRELESS COMMUNICATION SYSTEM, AND WIRELESS COMMUNICATION METHOD

CROSS-REFERENCE TO RELATED APPLICATION

The present application claims priority from Japanese application P2009-129933A filed on May 29, 2009, the content of which is hereby incorporated by reference into this application.

BACKGROUND

1. Field of the Invention

The present invention relates to a wireless communication device and a wireless communication method.

2. Description of the Related Art

With improvement of the communication speed and the usability, wireless communication techniques have been used widely in various situations and locations, for example, in the houses, offices, and schools. Wireless communication devices have been proposed to have various functions including broadband router function as well as general access point function (for example, JP-A-No. 2007-325041).

With advance of the wireless communication technology, there is a movement to extend the available range of carrier waves for wireless communication. This movement gives permission for the use of a 5 GHz frequency band, in addition to the conventionally used 2.4 GHz frequency band. In Japan, a frequency band of 5.25 to 5.35 GHz (corresponding to a W53 frequency band with four channels 52/56/60/64) was permitted for the indoor application in 2005. A W56 frequency band (5.470~5.725 GHz) with eleven channels 100/104/108/112/116/120/124/128/132/136/140 was permitted for both the indoor application and the outdoor application in 2007.

The W53 and W56 frequency bands are generally used by various radars including moving radars, such as radars on boats and ships, aircraft radars, and radars for military purposes, and stationary radars, such as weather radars. There is accordingly a possibility of interference with radio signals used by such equipment. For the purpose of adequate assignment, the wireless communication devices are obliged to avoid interference by DFS (Dynamic Frequency Selection) technique. The required DFS functions include CAC (Channel Availability Check) that monitors a channel for one minute prior to an actual use of the channel and gives permission for starting the actual use of the channel only after confirmation of non-detection of radar/radio signals at the channel and ISM (In-Service Monitoring) that continuously monitors detection of radar/radio signals during the use of the channel. In the event of detection of radar/radio signals at a current active channel, an adequate interference-avoiding measure is required to promptly stop the use of the current active channel within 10 seconds. Avoiding the interference by DFS is required in the countries such as China and Europe in which the use of the W53 or W56 frequency band is permitted. These DFS functions and other relevant functions are essential for access points and other devices and equipment workable as a base station in wireless communication.

The interference-avoiding measure by the DFS technique taken in response to detection of radar/radio signals at a current active channel in a frequency band means that the radar/radio signals have the priority of using the frequency band. Data transmission in a wireless LAN may thus be interrupted in the case of detection of radar/radio signals. When radar/radio signals are detected at a current active channel for the wireless LAN, the current active channel becomes unusable. During a CAC of a newly allocated channel, the newly allocated channel is not usable for the wireless communication. Even when no radar/radio signals are detected at the newly allocated channel, the wireless LAN is interrupted for one minute.

This problem is not characteristic of the communication in the wireless LAN but is also found in communication between multiple access points, for example, communication in a WDS mode.

SUMMARY

In order to solve at least part of the problem discussed above, the present invention is accomplished by any of various aspects and applications discussed below.

A first aspect of the invention is directed to a wireless communication device for establishing wireless communication. The wireless communication device comprises: a radio signal detection module configured to detect a radio signal other than the wireless communication at a current active channel currently used for the wireless communication; a monitor module configured to monitor a status of another channel that is different from the current active channel; and a channel change module configured to, when the radio signal is detected at the current active channel, change a communication channel used for the wireless communication from the current active channel, based on the status of the monitored channel.

The wireless communication device according to the first aspect of the invention monitors the status of another channel different from the current active channel, while establishing wireless communication at the current active channel. In the event of detection of the radio signal other than the wireless communication at the current active channel, the wireless communication device changes the communication channel used for the wireless communication from the current active channel, based on the status of the monitored channel. This arrangement assures an efficient channel change in the case of detection of the radio signal other than the wireless communication, for example, radar/radio signals, during the wireless communication. For example, the status of the monitored channel may represent:

(A) a state of in-service monitoring (ISM) with non-detection of the radio signal other than the wireless communication for a specified period; or (B) a state of channel availability check (CAC) to check for the availability of a channel for a specified period, prior to a shift to the ISM state.

In the event of detection of the radio signal other than the wireless communication, for example, radar/radio signals, at the monitored channel, the monitored channel is not usable for the wireless communication. The monitor module then starts monitoring a status of still another channel as a newly monitored channel. Typical examples of the radio signal other than the wireless communication include radar/radio signals, radio signals generated by electromagnetic cookers, and ham radio signals. Among these radio signals, only radio signals causing interference with the wireless communication may be specified as an object of detection. In the case of detection of radar/radio signals at the current active channel, the wireless communication device is obliged to take an interference-avoiding measure by DFS (dynamic frequency selection) technique. Only radio signals subject to the interference-avoiding measure may be specified as an object of detection.

In one preferable application of the wireless communication device according to the first aspect of the invention, in the case of non-detection of the radio signal at the monitored channel for a specified period, the monitor module sets the monitored channel as a subject of in-service monitoring. When the status of the monitored channel represents the subject of in-service monitoring, the channel change module changes the communication channel used for the wireless communication from the current active channel to the monitored channel.

In this application, the status of the monitored channel represents the state (A), that is, the state of in-service monitoring (ISM) with non-detection of the radio signal other than the wireless communication for the specified period. When changing the communication channel used for the wireless communication to the monitored channel, the channel change module is not required to recheck for non-detection of the radio signal other than the wireless communication at the monitored channel. This arrangement enables wireless communication to be reestablished promptly at the monitored channel and effectively prevents interruption of wireless communication for a long time period even in the event of detection of radar/radio signals.

In one preferable embodiment, the wireless communication device according to the first aspect of the invention further has a channel storage module configured to store a default channel of the wireless communication. When a predetermined time period has elapsed since a change of the communication channel used for the wireless communication from the default channel to another channel by the channel change module, the monitor module monitors a status of the default channel as a subject of monitoring. At a certain timing after elapse of the predetermined time period, when the status of the monitored default channel represents a subject of in-service monitoring with non-detection of the radio signal for a specified period, the channel change module changes back the communication channel used for the wireless communication to the default channel.

When the communication channel used for the wireless communication has been changed previously from the default channel in response to detection of the radio signal other than the wireless communication at the default channel, the wireless communication device of this embodiment changes back the communication channel to the default channel with no interruption of the wireless communication after elapse of the predetermined time period, for example, after elapse of a prohibition time of prohibiting the use of a channel after detection of the radio signal at the channel. The default channel is generally set for wireless communication. A temporary use of another channel for the wireless communication is inevitable on the occasion of detection of the radio signal other than the wireless communication. There is, however, a requirement to change back the communication channel to the default channel, when the default channel falls in an available status. For example, in the configuration of multiple wireless LANs established in different areas of a relatively large site for a facility, such as a school or a company, with a view to avoiding the interference, different channels are generally allocated to default channels of the respective wireless LANs. The wireless communication device of this embodiment temporarily changes the communication channel adopted in each of the multiple wireless LANs from its default channel, in response to detection of the radio signal other than the wireless communication, for example, radar/radio signals. After elapse of the predetermined time period, the wireless communication device of this embodiment changes back the communication channel in each wireless LAN to the default channel. This arrangement assures the stable wireless communication in the multiple wireless LANs.

In another preferable application of the wireless communication device according to the first aspect of the invention, the channel change module has a notification module configured to, on each occasion of a channel change of the communication channel used for the wireless communication to a newly allocated channel, give notice of the newly allocated channel, prior to or accompanied by the channel change.

The wireless communication device of this application notifies the other end of communication of a newly allocated channel, prior to or accompanied by a channel change. This arrangement enables the other end of communication to readily identify the newly allocated channel and assures reestablishment of communication within a short time period after the channel change.

In the wireless communication device according to the first aspect of the invention, the communication channel may be one channel selected among multiple available channels of W53 and W56 specified in a 5 GHz band of a carrier wave frequency. The radio signal other than the wireless communication may be a radio signal from a radar.

The wireless communication device of this arrangement meets the communication protocol of W53 and W56. The radar may be a stationary radar or a moving radar. Typical examples of the stationary radar include weather radars and radars in airports. Typical examples of the moving radar include radars for military purposes, radars on boats and ships, and aircraft radars.

In one preferable application of the invention, the wireless communication device further has at least one function among a repeater function, a broadband router function, and a LAN access point function.

The wireless communication device of this application can activate at least one of the repeater function, the broadband router function, and the LAN access point function, while avoiding interference with, for example, a moving radar during wireless communication. The interference of the radio signal in the wireless communication device of such functions means temporary disconnection to the network environment for general users operating individual terminals. It is thus of great significance to reestablish communication at a newly allocated channel at the early stage.

A second aspect of the invention is also directed to a wireless communication system for establishing wireless communication between at least two LANs with wireless communication devices.

At least one of the wireless communication devices comprises: a radio signal detection module configured to detect a radio signal other than the wireless communication at a current active channel currently used for the wireless communication; a monitor module configured to monitor a status of another channel that is different from the current active channel; and a channel change module configured to, when the radio signal is detected at the current active channel, change a communication channel used for the wireless communication from the current active channel, based on the status of the monitored channel.

The principle of the invention is also applicable to communication between at least two wireless communication devices. In the wireless communication system according to the second aspect of the invention, in the case of detection of radar/radio signals during communication between at least two LANs, the communication channel is changed immediately from the current active channel to the monitored channel set as a newly allocated channel. This arrangement enables wireless communication to be promptly reestablished at the newly allocated channel and significantly lowers the possibility of interruption of the communication between the at least two LANs.

The principle of the invention is also actualized by a wireless communication method of controlling wireless communication performed by a base station in a wireless LAN.

DESCRIPTION OF THE PREFERRED EMBODIMENTS

Some embodiments of the present invention are described below in the following sequence with reference to the accompanied drawings:
(1) First Embodiment
[1] Hardware Configuration of First Embodiment
[2] Communication Control in First Embodiment
[3] State of Channel Change in First Embodiment
(2) Second Embodiment
[1] Communication Control in Second Embodiment
(3) Other Aspects (1) First Embodiment

[1] Hardware Configuration of First Embodiment

Figure 1:
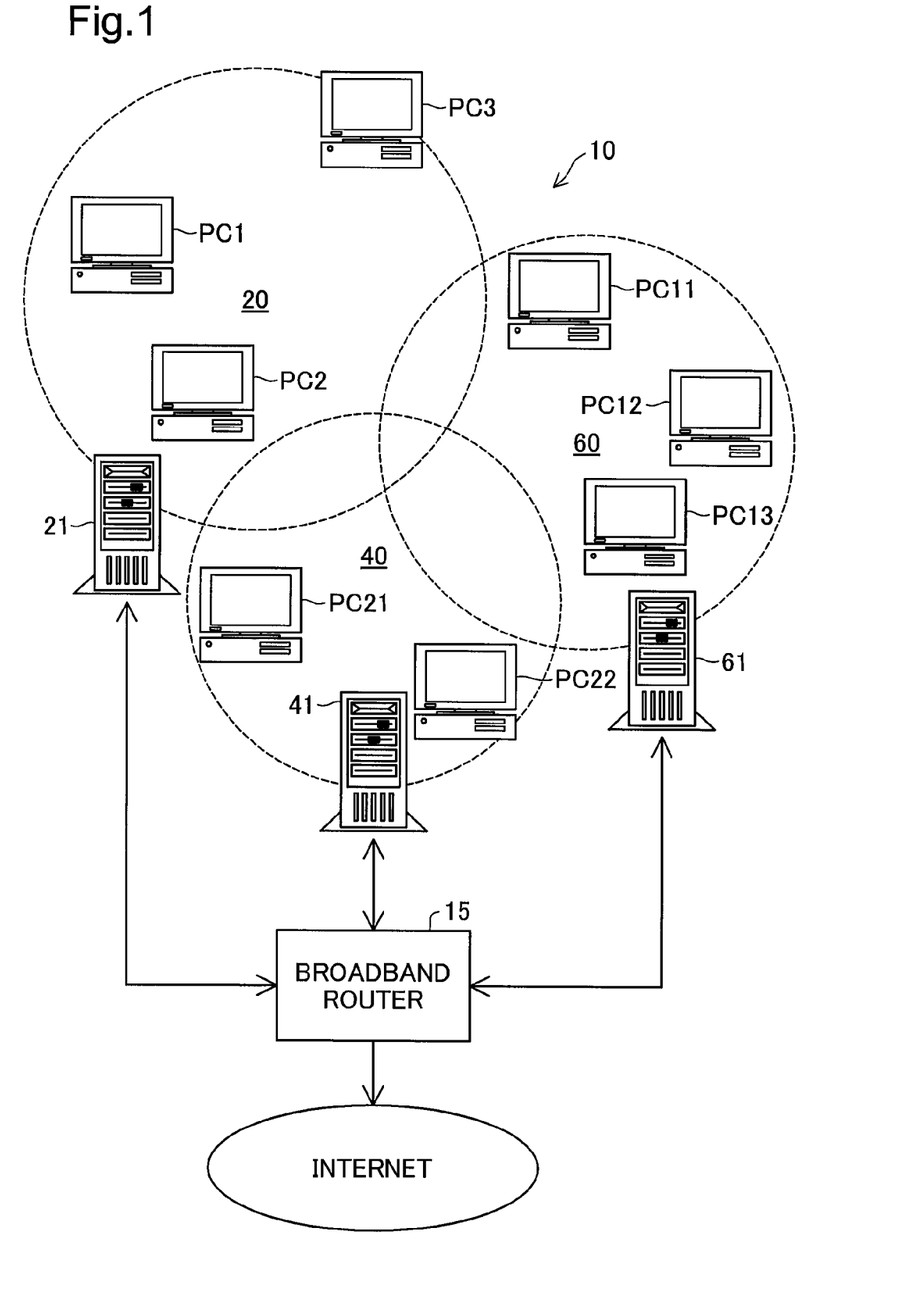
FIG. 1 is a diagrammatic representation of a system configuration in a first embodiment according to the invention.

One mode of carrying out the invention is described below with reference to the accompanied drawings. FIG. 1 is a diagrammatic representation of a system configuration of a wireless LAN system 10 in a first embodiment according to the invention. As illustrated, this wireless LAN system 10 includes a broadband router 15 connecting with an external network, for example, the Internet, and multiple wireless LAN access points 21, 41, and 61 respectively having wired connections to the broadband router 15. The respective access points 21, 41, and 61 are used to establish wireless LANs 20, 40, and 60 that adopt different basic service sets (BSS). These access points 21, 41, and 61 are provided to establish wireless LANs in different areas of a relatively large site for a facility, such as a school or a company. The wireless LANs 20, 40, and 60 have partial overlaps in the coverage of wireless communication, due to the characteristics of wireless LANs. In order to avoid the potential interference, different channels are generally allocated to the respective wireless LANs 20, 40, and 60.

The system of the first embodiment includes three access points for wireless LANs. The number of access points is, however, not restricted to three but may be determined arbitrarily according to the requirements of the system configuration. The respective access points 21, 41, and 61 have wired connections to the broadband router 15 in the system of this embodiment but may have wireless connections to the broadband router 15. In another configuration, the broadband router 15 may be connected to one of the access points, and the other access points establish wireless communication with the access point connected to the broadband router 15. Inter-access point communication in this latter configuration is specified as communication in a WDS (wireless distribution system) mode. Application of the invention to wireless communication in the WDS mode will be discussed later.

Each of the wireless LANs 20, 40, and 60 includes multiple computers PC1, PC2, . . . , PC11, PC12, . . . or PC21, PC22, . . . functioning as terminals. In the description hereafter, these computers may be collectively represented by 'computer PC'. The computer PC has a communication device provided for communication in the wireless LAN and establishes wireless communication with the access point 21, 41, or 61 in the corresponding wireless LAN 20, 40, or 60.

Figure 2:
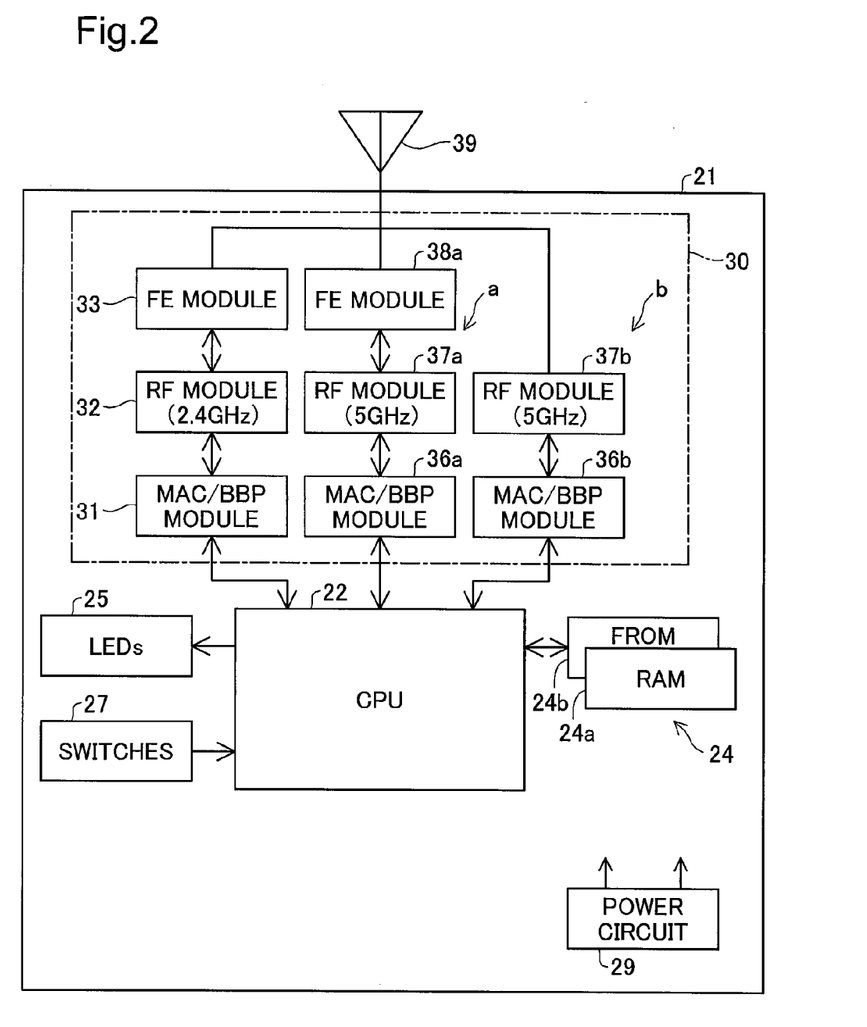
FIG. 2 is a block diagram showing the internal structure of each access point constructed as a wireless communication device in the first embodiment.

The internal structure of the access points 21, 41, and 61 is described below. FIG. 2 is a block diagram showing the internal structure of the access point 21. Since the other access points 41 and 61 have substantially the same structures as that of the access point 21, the internal structure of the access point 21 is discussed as a representative. As illustrated, the access point 21 includes a CPU 22 provided to control the overall operations of the access point 21, memories 24 arranged to store programs and relevant data therein, LEDs 25 structured to display the conditions of the access point 21, switches 27 operated to make various settings, a power circuit 29 arranged to allow for power supply, and a communication assembly 30 structured to perform various series of communication processing with regard to the wireless LAN. The CPU 22 has a built-in timer (not shown) used to determine whether a predetermined period has elapsed as discussed later.

The memories 24 include a random accessible RAM 24a and a flash ROM (FROM) provided for non-volatile storage of a monitor program and default settings in operations of the access points 21, 41, and 61. The default settings in the operations of the access points 21, 41, and 61 may be, for example, SSIDs (service set identifiers) or WEP (wired equivalent privacy) keys used in the respective wireless LANs 20, 40, and 60 or may otherwise be default channel numbers as discussed later.

The communication assembly 30 has three communication systems, one system for communication of the 2.4 GHz frequency band and two systems for communication of the 5 GHz frequency band. One of the two 5 GHz systems is used for wireless communication, while the other works as a monitor module. Hereafter the 5 GHz system used for wireless communication and the other 5 GHz system corresponding to the monitor module are respectively referred to as the communication system 'a' and the monitor system 'b'. The 2.4 GHz communication system, the 5 GHz communication system 'a', and the 5 GHz monitor system 'b' have substantially identical internal structures, except omission of an FE module (discussed later) from the monitor system 'b'. Namely the 2.4 GHz communication system and the 5 GHz communication system 'a' include MAC/BBP modules 31 and 36a, RF modules 32 and 37a, and FE modules 33 and 38a, respectively. The 5 GHz monitor system 'b' includes an MAC/BBP module 36b and an RF module 37b. The FE modules 33 and 38a and the RF module 37b are connected to a common antenna 39. In the configuration of this embodiment, the three modules are connected to the common antenna 39. Dedicated antennas may be provided individually for the FE modules 33 and 38a and the RF module 37b, or a dedicated antenna may be provided for only the monitor system 'b'.

Each of the MAC/BBP modules 31, 36a, and 36b of the communication assembly 30 is constructed as a one-chip element including module sections of a media access controller (MAC) and of a baseband processor (BBP). The MAC module section is located at a lower level than a data link layer (second layer) and performs data transmission and reception in the unit of a frame of a predetermined format and error detection. The BBP module section is structured as a circuit to perform modulation and demodulation of communication signals and encoding and decoding of communication signals. Namely the MAC/BBP modules 31, 36a, and 36b perform packetization of each signal as a communication object by adding a header, such as an MAC address, to the signal so as to generate communication data.

The RF modules 32, 37a, and 37b are structured to perform up-conversion and down-conversion of communication signals and denoising of communication signals. The FE modules 33 and 38a are respectively located between the common antenna 39 and the RF modules 32 and 37a and are designed as front end modules performing adjustment of the reception sensitivity, adjustment of the transmission output, and switchover to half-duplex signals. The omission of an FE module from the 5 GHz monitor system 'b' is ascribed to the fact that there is no requirement for switchover to half-duplex signals since the 5 GHz monitor system 'b' does not perform actual communication but performs only channel monitoring. The respective modules are involved in communication processing in the individual communication systems of the respective frequency bands. The communication system of the 5 GHz frequency band processes ordinary communications and also works as the 'radio signal detection module' to detect radio signals causing interference at a currently used wireless communication channel.

The access points 21, 41, and 61 having the configuration discussed above use the 5 GHz communication system for communication in an infrastructure mode within the respective wireless LANs 20, 40, and 60 (FIG. 1) according to the communication protocol of IEEE802.11n or IEEE802.11a. When the computer PC used as a terminal has only a 2.4 GHz communication function, the 2.4 GHz communication system may be used to perform communication in the infrastructure mode according to the communication protocol of IEEE802.11n or IEEE802.11g.

[2] Communication Control in First Embodiment

The respective access points 21, 41, and 61 perform communication control as discussed below. It is here assumed that required settings, such as SSIDs and WEP keys, have been completed in the respective access points 21, 41, and 61. In this state, the respective access points 21, 41, and 61 utilize the channel, SSID, and WEP key settings to establish communication with the computer PC. Each access point has a default setting of the channel. In the event of detection of radar/radio signals during communication at a 5 GHz channel, a channel change is required to continue the communication. Default channel numbers and available channel numbers are allocated to the respective access points in the first embodiment as shown in Table 1:

TABLE 1

| AP | Default CHD | Available | | | |
|---|---|---|---|---|---|
| | | CH1 | CH2 | CH3 | CH4 |
| 21 | 52 | 116 | 128 | 108 | 56 |
| 41 | 100 | 64 | 120 | 132 | 104 |
| 61 | 140 | 112 | 60 | 124 | 136 |

The data in relation to each access point (AP) is stored in the FROM 24b of the corresponding access point. In the description below, according to the indications in Table 1, the default channel number is referred to as 'default CHD', and the available channel numbers are referred to as 'available channels CH1, CH2, CH3, and CH4'.

These data may be set arbitrarily by the user or may be set automatically. In the latter case, the automatic setting may be performed, based on the entry of the number of access points (3 in this embodiment) having partial overlaps in wireless LAN communication and the input information on the total number of access points requiring channel number settings and an ordinal number allocated to each access point. In this embodiment, each of the access points 21, 41, and 61 sets the channel numbers of Table 1, based on the input information on the total number of access points and an ordinal number allocated to the access point. The channel numbers of Table 1 are set according to the following rules:

(1) Multiple access points should adopt channels farthest possible away from one another as respective defaults CHD;

(2) A first available channel CH1 as a possible candidate for a channel change from the default CHD (a channel monitored by the monitor system 'b') at each access point should be significantly apart from the default CHD. This rule should be applied to subsequent available channels CH2, CH3, and CH4; and (3) A channel number closest to the default CHD should be selected last as a possible candidate for a channel change among multiple available channels CH at each access point.

In conformity with the rule (1), the defaults CHD for the respective access points 21, 41, and 61 are set to be farthest possible away from one another in Table 1. Such setting aims to prevent the potential interference due to partial overlaps in the coverage of radio signals from the respective access points 21, 41, and 61 and to minimize the probability that two or more access points simultaneously detect radar/radio signals. In conformity with the rule (2), the available channels CH1, CH2, CH3, and CH4 for each of the access points 21, 41, and 61 in Table 1 are set to be apart from one another by at least three channels. Such setting aims to lower the probability that the same radar/radio signals are detected again after a channel change in response to detection of radar/radio signals. The settings in Table 1 are determined by taking into account potential subsequent channel changes from the first available channel CH1. A channel farthest away from the default CHD may otherwise be set to the first available channel CH1. In conformity with the rule (3), a closest channel to the default CHD among the multiple available channels is set to the last available channel CH4 at each access point in Table 1. Allocation of the channel closest to the default CHD at each access point to the last available channel CH4 at the access point aims to prevent the potential interference that may be caused by a small channel difference from a channel newly allocated at an adjacent access point as a result of a channel change.

Figure 3:
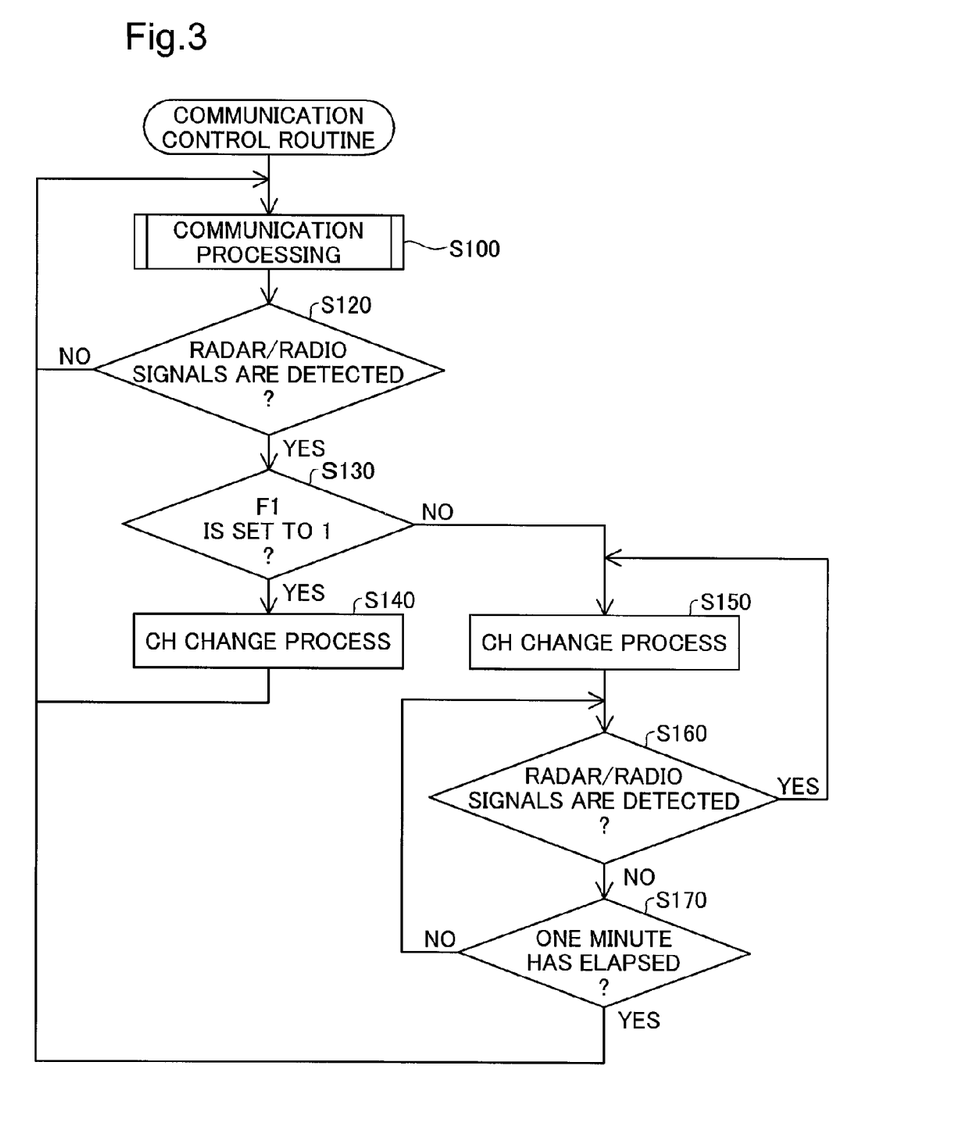
FIG. 3 is a flowchart showing a communication control routine performed by the access point in the first embodiment.
Figure 4:
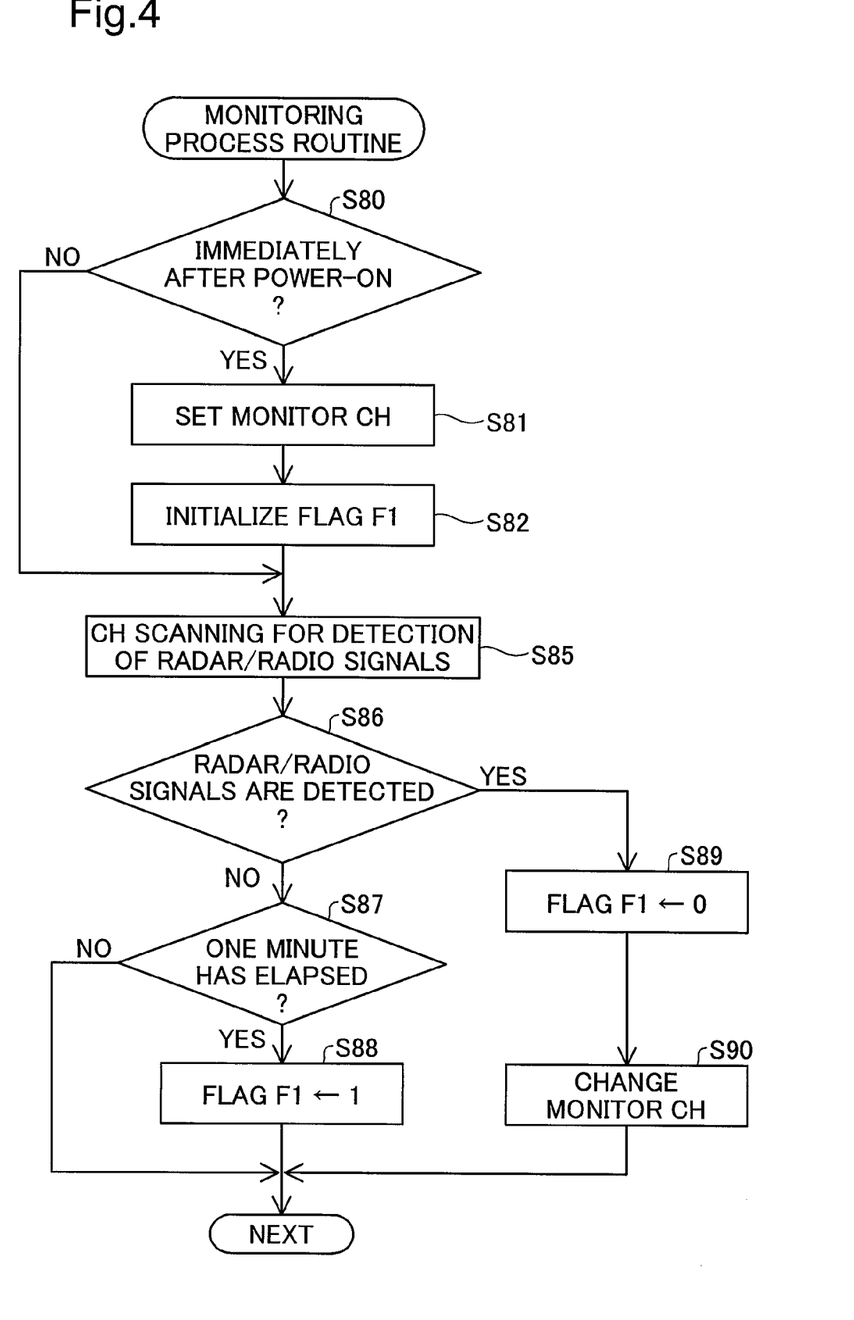
FIG. 4 is a flowchart showing a monitoring process routine performed by the access point in the first embodiment.

FIG. 3 is a flowchart showing a communication control routine performed by each of the access points 21, 41, and 61. FIG. 4 is a flowchart showing a monitoring process routine performed by each of the access points 21, 41, and 61. The monitor system 'b' shown in FIG. 2 is utilized for this monitoring process. The monitoring process is repeatedly performed at given intervals, separately from the communication control shown in FIG. 3. The monitoring process routine performed by utilizing the monitor system 'b' is described first with reference to FIG. 4.

When the monitoring process routine of FIG. 4 is activated at given intervals, it is first determined whether the current timing is immediately after a power-on (step S80). At the time immediately after the power-on (step S80: Yes), a monitor channel has not yet been set. The CPU 22 accordingly sets a monitor channel (step S81). The defaults CHD for wireless LAN communication and the available channels CH1, CH2, CH3, and CH4 as possible candidates for a newly allocated channel to be changed from the default CHD in response to detection of radars/radio signals at the default CHD have been set in advance with regard to the respective access points 21, 41, and 61 and stored in the FROM 24b, as mentioned previously. At the power-on time, the CPU 22 refers to the settings in the FROM 24b and sets the default CHD (for example, channel 52 with regard to the access point 21) to a current active channel currently used for wireless LAN communication and the first available channel CH1 (for example, channel 116 with regard to the access point 21) to the monitor channel as a subject of monitoring. The CPU 22 subsequently initializes a flag F1 reflecting the status of the monitor channel (step S82). The flag F1 represents a value set at a predetermined address AD in the RAM 24a. The initialization writes a value '0' at the predetermined address AD. Accompanied with the initialization of the flag F1, a channel number of the monitor channel set as the subject of monitoring is written at a next address AD+1 subsequent to the predetermined address AD for the flag F1. In this embodiment, the channel number 116 of the first available channel CH1 is written at the next address AD+1 as the monitor channel.

On completion of the above series of processing performed immediately after the power-on, scanning the status of the set monitor channel is started (step S85). When the current timing is not immediately after the power-on (step S80: No), scanning the status of the set monitor channel is commenced (step S85) at once without the processing of steps S81 and S82. The CPU 22 subsequently determines whether radar/radio signals are detected at the monitor channel (step S86). Information exchange with the MAC/BBP module 36b enables the CPU 22 to detect the interference with radar/radio signals at the monitor channel.

When no radar/radio signals are detected at the monitor channel (step S86: No), it is subsequently determined whether one minute has elapsed since the start of scanning the monitor channel (step S87). When one minute has not yet elapsed (step S87: No), the current cycle of the monitor control routine is terminated. When it is determined that at least one minute has elapsed without detection of radar/radio signals since the start of scanning the monitor channel (step S87: Yes), on the other hand, the monitor channel is specified as a subject of in-service monitoring (ISM) for the continuous use. The CPU 22 then sets the flag F1 at the predetermined address AD in the RAM 24a (step S88). A concrete procedure of setting the flag F1 sets a value '1' at the predetermined address AD. In this state, the flag F1 is set to the value '1', and the channel number of the monitor channel specified as the subject of in-service monitoring for the continuous use is set at the next address AD+1. This channel number is utilized for the communication control shown in FIG. 3.

When radar/radio signals are detected (step S86: Yes) as the result of scanning the monitor channel (step S85), the CPU 22 resets the flag F1 (step S89) and changes the monitor channel (step S90). A concrete procedure of resetting the flag F1 sets the value '0' at the predetermined address AD. A concrete procedure of changing the monitor channel refers to the settings in Table 1 and sets a next available channel CH to the monitor channel as the subject of monitoring. The procedure of this embodiment changes the monitor channel in the event of detection of radar/radio signals, based on the settings in Table 1. One modified procedure may set a new monitor channel as a next subject of monitoring at random.

In the course of repetition of the above monitoring process routine at the given intervals, when non-detection of radar/radio signals at the monitor channel continues for at least one minute, the flag F1 is set to the value '1' at the predetermined address AD in the RAM 24a. In this state, the channel having the channel number set at the next address AD+1 is subject to in-service monitoring for the continuous use. When radar/radio signals are detected at the monitor channel, on the other hand, the flag F1 is reset to the value '0'. The monitor channel as the subject of monitoring is then successively changed until any channel without detection of radar/radio signals is found. When non-detection of radar/radio signals at the monitor channel newly set as the subject of monitoring continues for at least one minute, the flag F1 is set to the value '1'. The communication control refers to the setting of this flag F1 to identify the status of the current monitor channel. It is also determinable whether there is any channel without detection of radar/radio signals for at least one minute by referring to the setting of the flag F1.

The communication control performed at the access point 21 utilizing the flag F1 is described below with reference to the flowchart of FIG. 3. The CPU 22 of the access point 21 performs ordinary communication processing with the computer PC (step S100) and determines whether radar/radio signals are detected at a current active channel currently used for wireless LAN communication (step S120). The CPU 22 is informed of the presence or the absence of radar/radio signals, such as a moving radar, at the current active channel, as a response to an inquiry to the communication assembly 30. When no radar/radio signals are detected at the current active channel (step S120: No), the CPU 22 returns the processing flow to perform the ordinary communication processing (step S100) and continue communication in the wireless LAN.

In the event of detection of radar/radio signals at the current active channel (step S120: Yes) in the course of continued communication, the CPU 22 refers to the setting of the flag F1 at the predetermined address AD in the RAM 24a and identifies whether the flag F1 is set to the value '1' (step S130). The flag F1 set to the value '1' suggests the presence of a channel without detection of radar/radio signals for at least one minute in the monitoring process routine. When the setting of the flag F1 is identified as the value '1' (step S130: Yes), the CPU 22 changes the communication channel used for wireless LAN communication from the current active channel to a newly allocated channel (step S140). In the event of detection of radar/radio signals at a certain channel, the access point 21 is obliged to stop the use of the certain channel within 10 seconds. The CPU 22 thus immediately stops the use of the current active channel and changes the communication channel from the current active channel to the newly allocated channel. Here the newly allocated channel is the channel determined to have non-detection of radar/radio signals for at least one minute and specified as the subject of in-service monitoring (ISM) for the continuous use (step S88) in the monitoring process routine. This channel is thus usable at once as the newly allocated channel for wireless LAN communication without a waiting time of one minute. After the channel change at step S140, the CPU 22 returns the processing flow to step S100 to perform the ordinary communication processing. The access point 21 is then allowed to broadcast a beacon immediately at the newly allocated channel.

The computer PC located in the coverage of the wireless LAN 20 established by the access point 21 detects the beacon to change its communication channel used for wireless LAN communication. This is the standard channel change procedure in the wireless LAN communication. In this embodiment, on the occasion of a channel change, the access point 21 does not specifically notify the computer PC of a newly allocated channel. One modified procedure may cause the access point 21 to notify the computer PC of the value set at the next address AD+1 subsequent to the address AD for the flag F1, as a newly allocated channel. As mentioned above, in the event of detection of radar/radio signals at a current active channel, the access point 21 is obliged to stop the use of the current active channel within 10 seconds. In other words, the access point 21 is allowed to use the current active channel for communication in 10 seconds on the condition that the total transmission time does not exceed 260 msec. The computer PC located in the coverage of a wireless LAN to make communication may thus be informed of a newly allocated channel for wireless LAN communication. The notification may include information specifying the newly allocated channel as a CAC (channel availability check)-finished channel, as well as a channel number of the newly allocated channel.

When the setting of the flag F1 is not identified as the value '1' (step S130: No), the CPU 22 changes the communication channel used for wireless LAN communication from the current active channel to one available channel (step S150) and determines whether radar/radio signals are detected at the available channel (step S160). When no radar/radio signals are detected (step S160: No), the CPU 22 subsequently determines whether one minute has elapsed since the channel change (step S170). Until one minute has elapsed without detection of radar/radio signals, the CPU 22 returns the processing flow to step S160 to repeat this series of processing. The channel determined to have non-detection of radar/radio signals for one minute after the channel change is specified as a CAC-finished channel. The CPU 22 then returns the processing flow to perform the ordinary communication processing (step S100). Monitoring detection of radar/radio signals for one minute aims to meet the requirement of the DFS.

In the event of redetection of radar/radio signals in one minute (step S160: Yes), the CPU 22 returns the processing flow to step S150 to change the communication channel again to another available channel as a newly allocated channel. Subsequently the CPU 22 monitors detection or non-detection of radar/radio signals at the newly allocated channel for one minute (steps S160 and S170). In the case of non-detection of radar/radio signals for one minute, the CPU 22 returns the processing flow to perform the ordinary communication process (step S100). After returning to the ordinary communication processing (step S100), the access point 21 is allowed to broadcast a beacon immediately at the newly allocated channel. The computer PC located in the coverage of the wireless LAN 20 detects the beacon, sets the newly allocated channel to its communication channel, and establishes communication with the access point 21.

[3] State of Channel Change in First Embodiment

Figure 5:
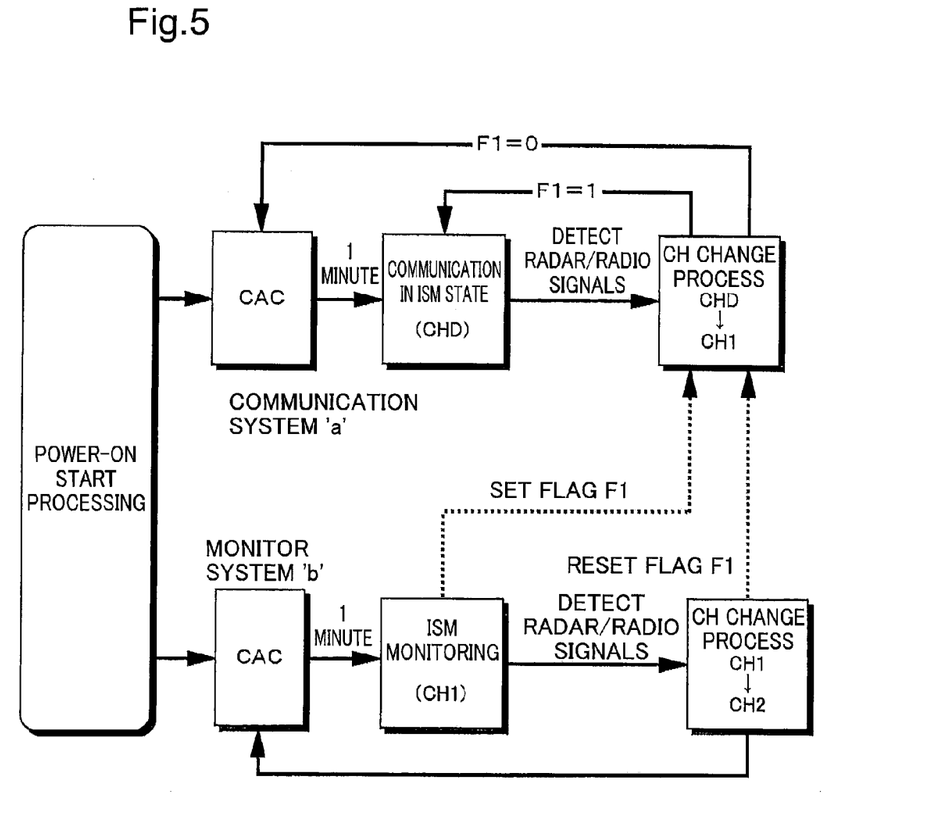
FIG. 5 is a block diagram showing a status change in the first embodiment.

In the configuration of the first embodiment discussed above, the access point 21 has the monitor system 'b'. During communication in the wireless LAN 20 at a certain channel in the 5 GHz frequency band, the access point 21 continuously monitors the status of another channel in the same 5 GHz frequency band and stores the result of monitoring into the flag F1 set at the predetermined address AD and the channel number as the subject of monitoring at the next address AD+1. In the event of detection of radar/radio signals at the current active channel for communication, the communication channel is immediately changeable from the current active channel, based on the status of the monitored channel Especially when the monitored channel is subject to in-service monitoring (ISM), this status of the monitored channel as the ISM subject is identifiable by the setting of the flag F1. After a change of the communication channel for wireless LAN communication to the monitored channel as a newly allocated channel, the access point 21 is allowed to broadcast a beacon immediately and to reestablish wireless LAN communication at the newly allocated channel. This arrangement assures the uninterrupted operation of the wireless LAN established by the access point 21. FIG. 5 shows one example of status change of the communication system 'a' and the monitor system 'b' in one access point in the configuration of the first embodiment. In the illustrated example of FIG. 5, as the monitor system 'b' falls in the state of in-service monitoring (ISM) to monitor the available channel CH1, the communication system 'a' detects radar/radio signals. As clearly shown in this example, when the monitor system 'b' is in the ISM state (F=1) at the time of detection of radar/radio signals, the communication system 'a' changes its communication channel from the default CHD to the monitored available channel CH1 as a newly allocated channel and subsequently returns to the communication in the ISM state at the newly allocated channel. When the monitor system 'b' is not in the ISM state (F=0) at the time of detection of radar/radio signals, on the other hand, the communication system 'a' similarly changes its communication channel but shifts to the CAC (channel availability check) operation.

In the first embodiment, different defaults and available channels are allocated previously to the three access points 21, 41, and 61 as shown in Table 1. Even when there are partial overlaps in the coverage of radio signals from the respective access points 21, 41, and 61, such channel allocation desirably prevents any channel overlap between the respective access points 21, 41, and 61 on the occasion of a channel change in response to detection of radar/radio signals. The defaults CHD for the respective access points 21, 41, and 61 are set to be farthest possible away from one another. Such channel setting desirably lowers the possibility that, in the case of detection of radar/radio signals by one of the access points 21, 41, and 61, another access point simultaneously detects radar/radio signals. The available channels CH1, CH2, CH3, and CH4 to be successively changed by each of the access points 21, 41, and 61 are set to be apart from one another by at least three channels. Such channel setting lowers the probability that the same radar/radio signals are detected again after a channel change in response to detection of radar/radio signals. Generally only one channel change is thus sufficient to reestablish and continue wireless LAN communication at a newly allocated channel. When the flag F1 is not set to '1' at the time of detection of radar/radio signals, the communication control of this embodiment causes the communication system 'a' to assure non-detection of radar/radio signals for one minute. One modified procedure of the communication control may wait for the flag setting (F1=1) by the monitor system 'b'. Another modified procedure of the communication control may utilize the earlier between the non-detection by the communication system 'a' and the flag setting by the monitor system 'b'.

(2) Second Embodiment

[1] Communication Control in Second Embodiment

A wireless LAN system of a second embodiment according to the invention is described below. The wireless LAN system of the second embodiment has substantially the same configuration as that of the first embodiment shown in FIGS. 1 and 2, except part of the processing performed by the access points 21, 41, and 61. Only the different points from the first embodiment are discussed below.

Figure 6:
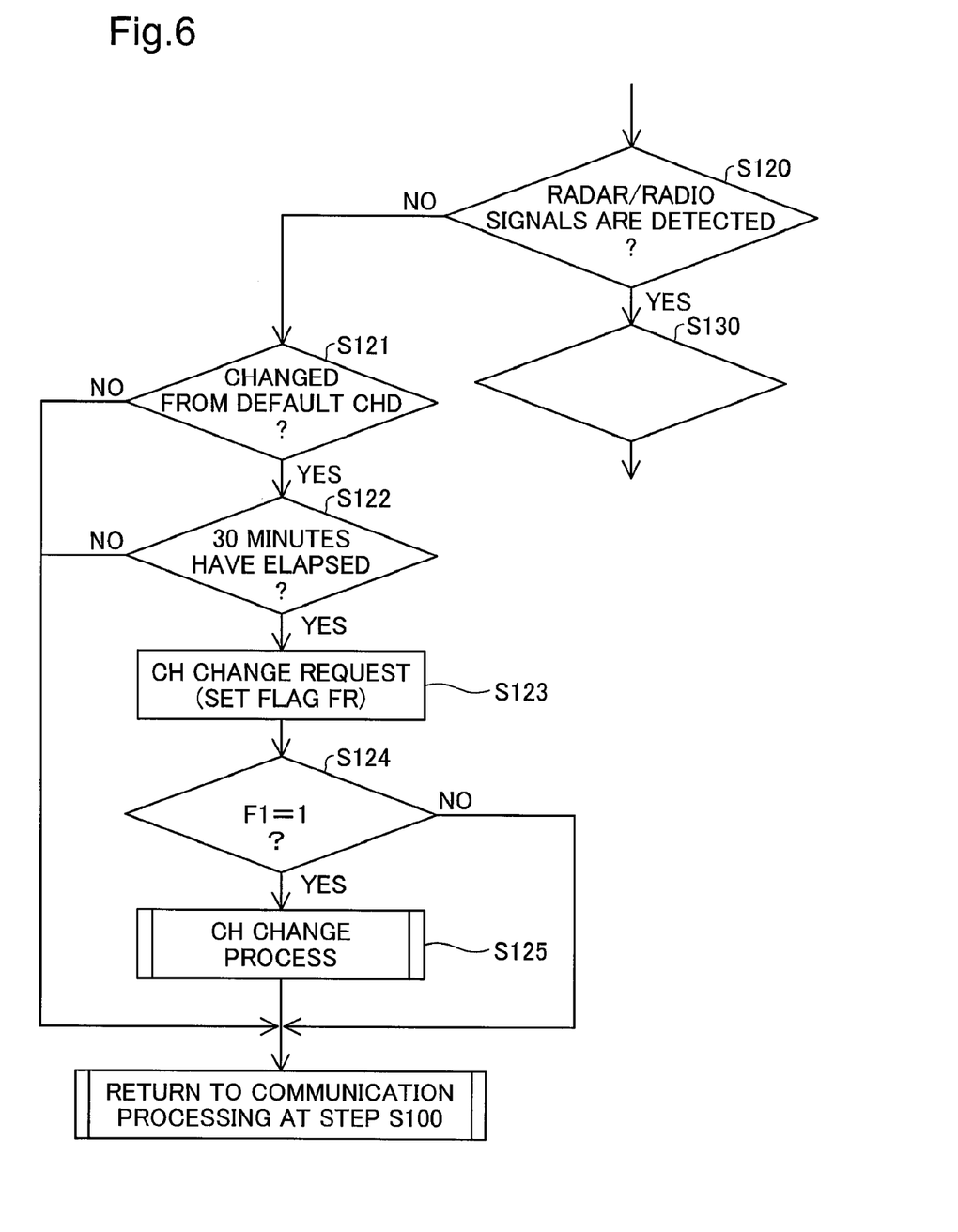
FIG. 6 is a flowchart showing a main part of the communication control routine performed in a second embodiment.
Figure 7:
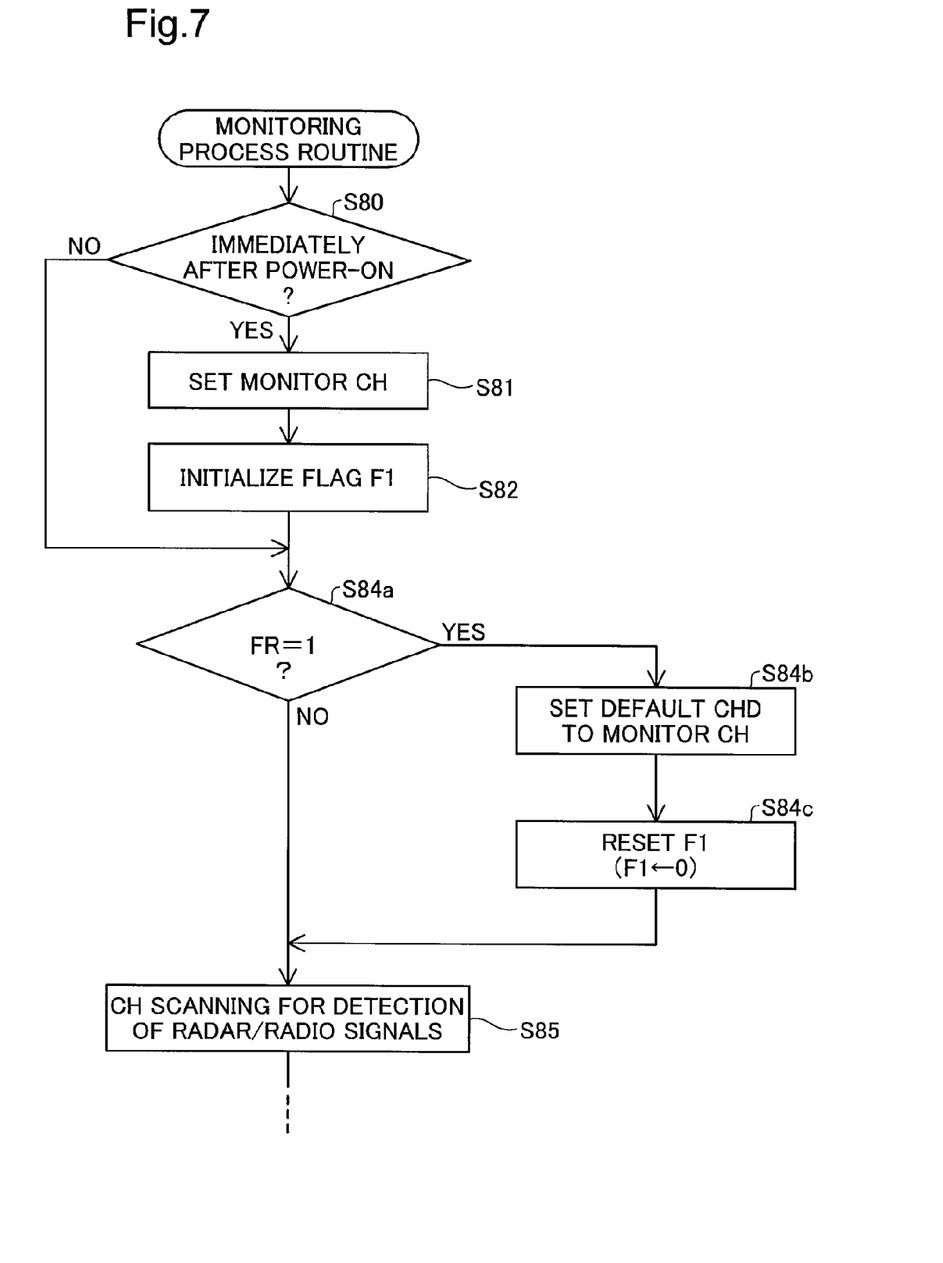
FIG. 7 is a flowchart showing a main part of the monitoring process routine performed in the second embodiment.

The flowchart of FIG. 6 mainly shows a different part of the communication control routine of the second embodiment performed by an access point (for example, the access point 21) from that of the first embodiment. The flowchart of FIG. 7 mainly shows a different part of the monitoring process routine of the second embodiment from that of the first embodiment. As shown in the flowchart of FIG. 6, in the case of non-detection of radar/radio signals, the access point 21 of the second embodiment does not immediately return to the ordinary communication processing (step S100) but determines whether the communication channel has already been changed from the default CHD (step S121). When the communication channel has already been changed from the default CHD (step S121: Yes), the CPU 22 refers to the count on the built-in timer and determines whether 30 minutes have elapsed since the channel change (step S122). When the communication channel has not yet been changed from the default CHD (step S121: No) or when 30 minutes have not yet elapsed since the channel change (step S122: No), the CPU 22 returns the processing flow to perform the ordinary communication processing at step S100.

When 30 minutes have elapsed since the channel change from the default CHD (both step S121 and S122: Yes), the CPU 22 sets a flag FR, which represents a channel change request to the default CHD (step S123). A concrete procedure of step S123 changes the setting of the flag FR from an initial value '0' to a value '1'. In the monitoring process routine of FIG. 7, an affirmative answer 'Yes' is given at step S84a of determining whether the flag FR is set to '1'. The CPU 22 then sets the default CHD to a monitor channel as a subject of monitoring by the monitor system 'b' (step S84b) and resets the flag F1 to '0' (step S84c). The monitoring process routine then performs the CAC operation or the channel scanning to monitor the presence of interference at the default CHD set to the monitor channel (step S85) and subsequent steps. On completion of the CAC operation at the set monitor channel (default CHD), the monitoring process routine sets the flag F1 to '1'. In the event of redetection of radar/radio signals at the monitored default CHD, the monitoring process routine resets the flag FR to '0' and resets the count on the built-in timer, which counts the time after the channel change from the default CHD, in addition to changing the monitor channel (step S90 in FIG. 4).

After setting the flag FR at step S123, the access point 21 identifies whether the flag F1 is set to '1' at step S124 in the communication control routine of FIG. 6. The access point 21 returns to step S100 to perform the ordinary communication processing until the flag F1 is set to '1'. The monitoring process routine of FIG. 7 resets the flag F1 to '0' in response to the setting of the flag FR to '1' at step S123 of FIG. 6 and does not set the flag F1 to '1' until completion of the CAC operation. An affirmative answer 'Yes' is given at step S124 of FIG. 6, when the flag F1 is set to '1' on completion of the CAC operation. The access point 21 then changes back the communication channel to the default CHD (step S125) and returns to step S100 to perform the ordinary communication processing.

Figure 8:
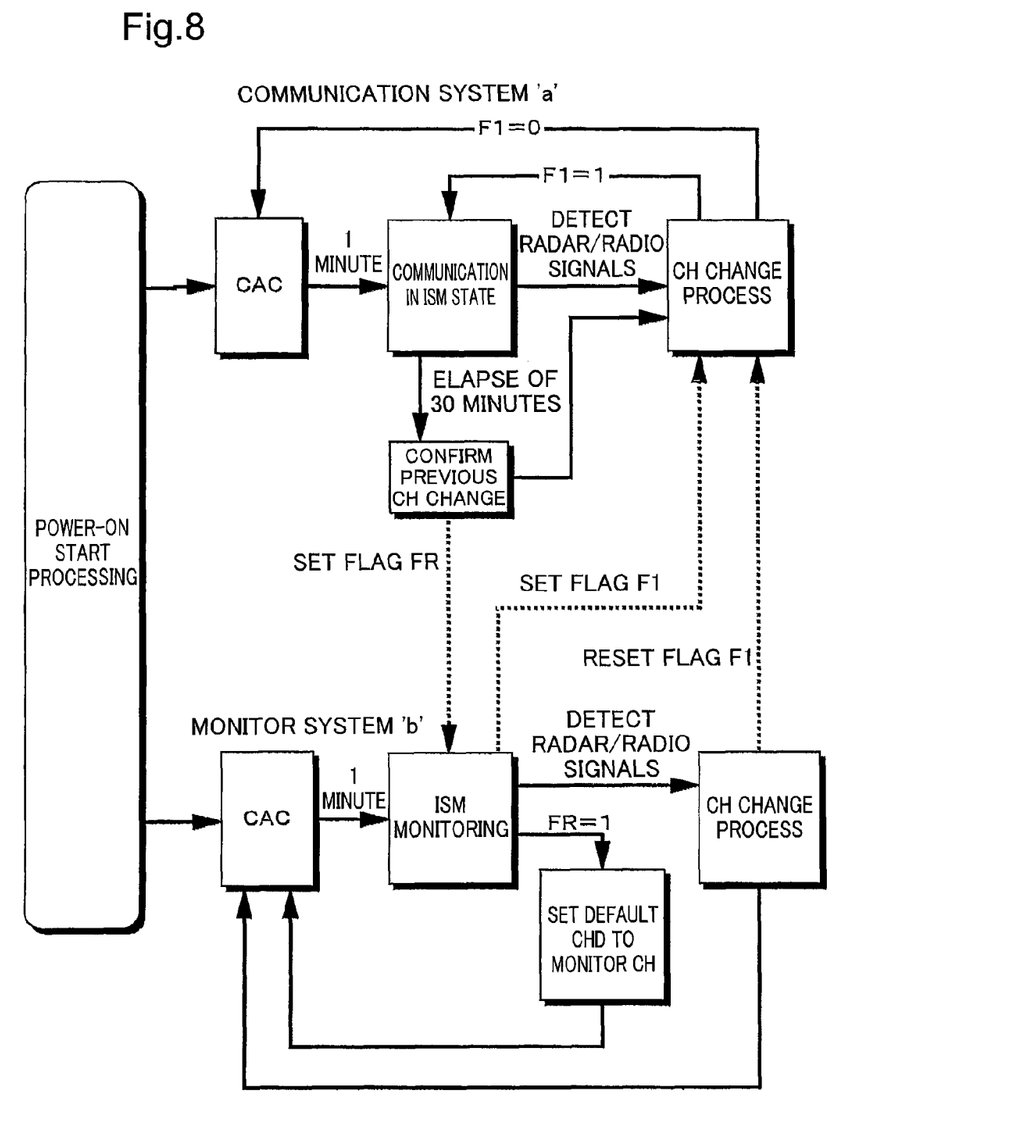
FIG. 8 is a block diagram showing a status change in the second embodiment.

FIG. 8 shows one example of status change of the communication system 'a' and the monitor system 'b' in one access point in the configuration of the second embodiment. In the illustrated example of FIG. 8, the flag FR is set to '1', when 30 minutes have elapsed since the change of the communication channel from the default CHD to the available channel CH1 in response to detection of radar/radio signals. The monitor system 'b' then sets the default CHD to the monitor channel and performs the CAC operation. In the case of non-detection of radar/radio signals for one minute, the flag F1 is set to '1'. After elapse of 30 minutes, the communication system 'a' refers to the setting of the flag F1, shifts to the channel change process to change back the communication channel to the default CHD, and starts the communication in the ISM state.

In addition the similar series of processing performed in the first embodiment, the procedure of the second embodiment allows the communication channel to be changed back to the default CHD under the condition that 30 minutes have elapsed since the previous change of the communication channel from the default CHD. In the configuration of this embodiment, the three access points 21, 41, and 61 adopt the different basic service sets (BSS) of wireless LANs and have partial overlaps in the coverage of radio signals. Changing back the communication channels of the respective access points 21, 41, and 61 to their defaults CHD set farthest possible away from one another is effective to prevent the potential interference between the respective wireless LANs. The wireless LAN system of the second embodiment has the three access points. In a wireless LAN system having a greater number of access points, this characteristic of promptly changing back the communication channels of the respective access points to their defaults CHD is advantageous for management of the wireless LAN system, as well as for prevention of the potential interference. In the event of detection of radar/radio signals in the course of a channel change to the default CHD, the second embodiment performs the same series of processing as that discussed in the first embodiment.

(3) Other Aspects

In the first and the second embodiments discussed above, the monitor system 'b' monitors an available channel set as a possible candidate for a newly allocated channel in each of the wireless LANs 20, 40, and 60. In one modified configuration, the subject of monitoring may be a channel adopted for communication between two access points in the WDS mode as shown in FIG. 9.

Figure 9:
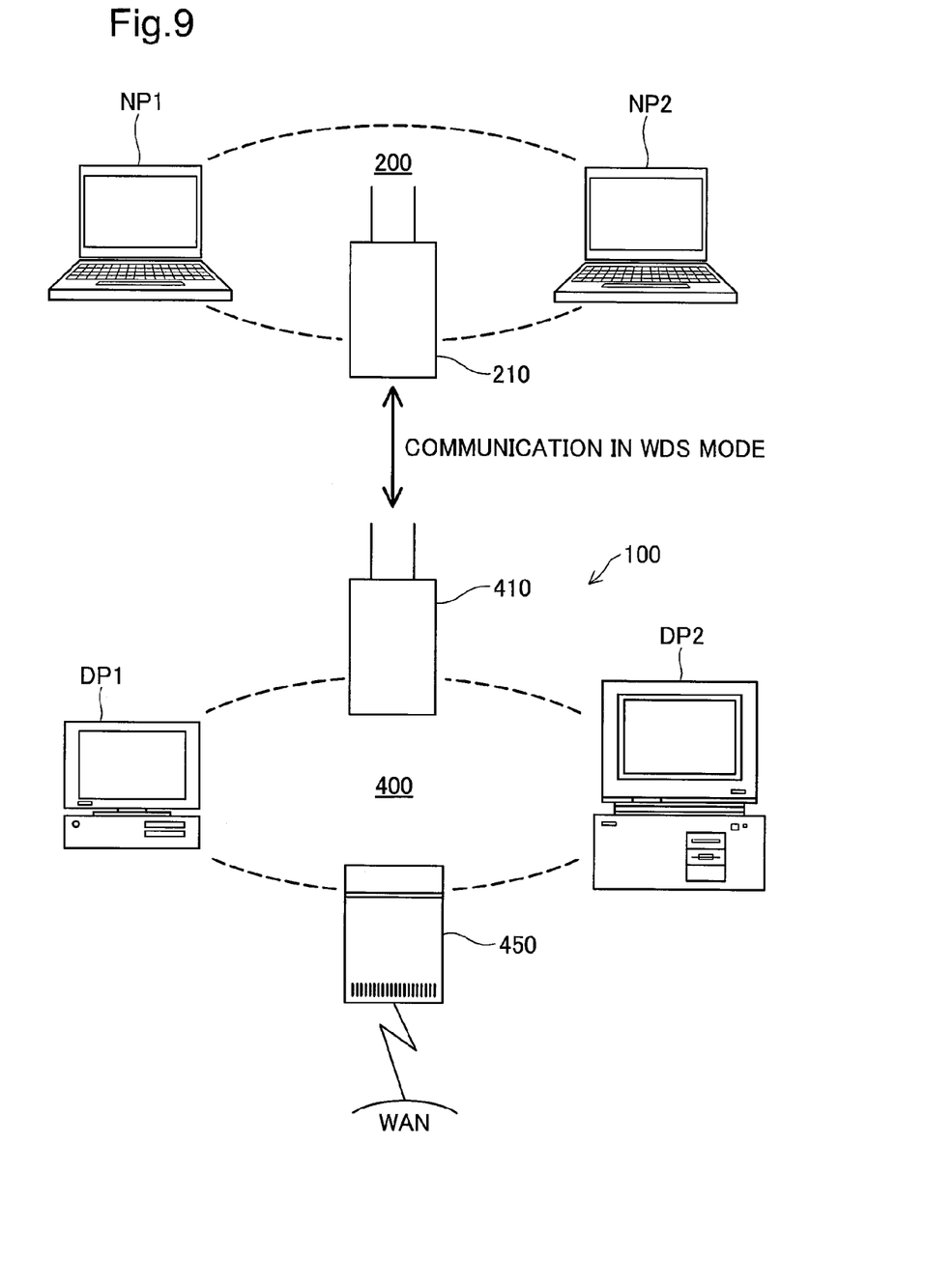
FIG. 9 is a diagrammatic representation of a system configuration for communication in a WDS mode.

FIG. 9 is a diagrammatic representation of the configuration of a wireless LAN system 100 including two wireless LANs 200 and 400. The respective wireless LANs 200 and 400 adopt different basic service sets (BSS) and have access points 210 and 410 interconnected by inter-access point communication or wireless distribution system (WDS). The wireless LAN system 100 is connected to a WAN (wide area network: the Internet in this embodiment) via a broadband router 450 provided on the side of the wireless LAN 400. This connection enables all terminals belonging to the wireless LAN system 100 to access and utilize the Internet. In the configuration of this embodiment, the broadband router 450 is provided separately from the access point 410. One modified configuration may use one integral device designed to have both the functions of a broadband router and an access point. Another modification may adopt the configuration of a simple LAN network without connection to the WAN. The wireless LANs 200 and 400 may partly be replaced by a wired LAN arrangement.

In the illustrated example of FIG. 9, two laptop computers NP1 and NP2 are connected to the wireless LAN 200, whereas two desktop computers DP1 and DP2 are connected to the wireless LAN 400. A communication protocol IEEE802.11n or IEEE802.11g (infrastructure mode) is adopted for wireless communication within each of the wireless LANs 200 and 400. This wireless communication has an effective frequency band of 2.4 GHz. A communication protocol IEEE802.11a is adopted, on the other hand, for inter-access point communication between the respective access points 210 and 410. The inter-access point communication has an effective frequency band of 5 GHz and uses W53 and W56 channels.

The access points 210 and 410 have substantially the same internal structure to that of the access points 21, 41, and 61 of the first and the second embodiments discussed above. The communication control and the monitoring process of either the first embodiment or the second embodiment are applicable to a channel change during the inter-access point communication in the WDS mode. In the respective access points 210 and 410, the monitor system 'b' monitors the status of the available channel CH. When the monitored channel CH is subject to in-service monitoring (ISM), an access point detecting radar/radio signals refers to the setting of the flag F1 and immediately changes the communication channel in the WDS mode to the monitored channel as a newly allocated channel to continue the communication in the WDS mode at the newly allocated channel. The access point setting the newly allocated channel may notify the other access point on the other end of communication of the newly allocated channel. When the CAC operation has been completed for the monitored channel as the subject of monitoring by the monitor system 'b', the monitored channel is immediately usable for communication. This arrangement reduces the possibility of interruption of the communication in the WDS mode for a period required for the CAC operation. This arrangement thus effectively prevents the potential disconnection of the wireless LAN 200 without the broadband router 450 from the WAN, such as the Internet, for a significant period.

The embodiments and their modifications and applications discussed above are to be considered in all aspects as illustrative and not restrictive. There may be many other modifications, changes, and alterations without departing from the scope or spirit of the main characteristics of the present invention. For example, the technique of the invention is similarly applicable to communication among four or more access points or to communication in other frequency bands. The object of detection may be any arbitrary radio signals other than the radar/radio signals, in addition to or in place of the radar/radio signals. In the case of detection of any radio signal other than the wireless communication, the communication channel may be changed to a monitored channel by taking into account the possibility of a decrease in throughput of wireless communication due to the potential interference. A channel change is not obligatory for the radio signals other than the radar/radio signals. In the case of detection of any strong radio signals, there is the possibility of interference. A channel change to avoid such potential interference is advantageous. In the embodiments discussed above, the monitor system 'b' monitors the status of a channel in the 5 GHz frequency band. The monitor system 'b' may be constructed to monitor the status of another frequency band.

What is claimed is:

1. A wireless communication device for establishing wireless communication as a base station in a wireless LAN, the wireless communication device comprising:
   a communication module configured to activate wireless communication using a predetermined channel;
   a radio signal detection module configured to detect a radio signal other than the wireless communication at a current active channel currently used by the communication module for the wireless communication;
   a monitor module that is provided separately of the communication module and configured to monitor a status of another channel that is different from the current active channel, while the communication module communicates wirelessly at the current active channel; and
   a channel change module configured to, when the radio signal is detected at the current active channel, change a communication channel used for the wireless communication from the current active channel, based on the status of the monitored channel.

2. The wireless communication device in accordance with claim 1, wherein in the case of non-detection of the radio signal at the monitored channel for a specified period, the monitor module sets the monitored channel as a subject of in-service monitoring, and
   when the status of the monitored channel represents the subject of in-service monitoring, the channel change module changes the communication channel used for the wireless communication from the current active channel to the monitored channel.

3. A wireless communication device for establishing wireless communication as a base station in a wireless LAN, the wireless communication device comprising:
   a radio signal detection module configured to detect a radio signal other than the wireless communication at a current active channel currently used for the wireless communication;
   a monitor module configured to monitor a status of another channel that is different from the current active channel;
   a channel change module configured to, when the radio signal is detected at the current active channel, change a communication channel used for the wireless communication from the current active channel, based on the status of the monitored channel; and
   a channel storage module configured to store a default channel of the wireless communication,
   wherein when a predetermined time period has elapsed since a change of the communication channel used for the wireless communication from the default channel to another channel by the channel change module, the monitor module monitors a status of the default channel as a subject of monitoring, and
   at a certain timing after elapse of the predetermined time period, when the status of the monitored default channel represents a subject of in-service monitoring with non-detection of the radio signal for a specified period, the channel change module changes back the communication channel used for the wireless communication to the default channel.

4. The wireless communication device in accordance with claim 1, wherein the channel change module has a notification module configured to, on each occasion of a channel change of the communication channel used for the wireless communication to a newly allocated channel, give notice of the newly allocated channel, prior to or accompanied by the channel change.

5. The wireless communication device in accordance with claim 1, wherein the communication channel is one channel selected among multiple available channels of W53 and W56 specified in a 5 GHz band of a carrier wave frequency, and the radio signal other than the wireless communication is a radio signal from a radar.

6. The wireless communication device in accordance with claim 1, the wireless communication device further having at least one function among a repeater function, a broadband router function, and a LAN access point function.

7. A wireless communication system for establishing wireless communication between at least two LANs with wireless communication devices,
 at least one of the wireless communication devices comprising:
 a communication module configured to activate wireless communication using a predetermined channel;
 a radio signal detection module configured to detect a radio signal other than the wireless communication at a current active channel currently used by the communication module for the wireless communication;
 a monitor module that is provided separately of the communication module and configured to monitor a status of another channel that is different from the current active channel, while the communication module communicates wirelessly at the current active channel; and
 a channel change module configured to, when the radio signal is detected at the current active channel, change a communication channel used for the wireless communication from the current active channel, based on the status of the monitored channel.

8. A wireless communication method of controlling wireless communication performed by a base station in a wireless LAN, the control method comprising:
 activating wireless communication using a predetermined channel;
 detecting a radio signal other than the wireless communication at a current active channel currently used for the wireless communication;
 monitoring a status of another channel that is different from the current active channel, while communicating wirelessly at the current active channel; and
 when the radio signal is detected at the current active channel, changing a communication channel used for the wireless communication from the current active channel, based on the status of the monitored channel.

\* \* \* \* \*